(12) United States Patent
Thoukydides

(10) Patent No.: US 8,942,274 B2
(45) Date of Patent: Jan. 27, 2015

(54) RADIO APPARATUS

(75) Inventor: Alexander Thoukydides, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 641 days.

(21) Appl. No.: 13/146,486

(22) PCT Filed: Jan. 11, 2010

(86) PCT No.: PCT/EP2010/050212
§ 371 (c)(1),
(2), (4) Date: Oct. 12, 2011

(87) PCT Pub. No.: WO2010/086207
PCT Pub. Date: Aug. 5, 2010

(65) Prior Publication Data
US 2012/0250737 A1    Oct. 4, 2012

(30) Foreign Application Priority Data

Jan. 29, 2009    (GB) .................................. 0901504.1

(51) Int. Cl.
| H04B 1/38 | (2006.01) |
| H04L 5/16 | (2006.01) |
| H04W 72/12 | (2009.01) |
| H04L 29/06 | (2006.01) |
| G10L 25/78 | (2013.01) |
| H04W 88/06 | (2009.01) |

(52) U.S. Cl.
CPC ........... *H04W 72/1215* (2013.01); *H04L 69/18* (2013.01); *G10L 25/78* (2013.01); *H04W 72/1242* (2013.01); *H04W 88/06* (2013.01)
USPC .................................. 375/219; 455/73; 710/1

(58) Field of Classification Search
USPC ......................................................... 375/219
See application file for complete search history.

(56) References Cited

U.S. PATENT DOCUMENTS

| 7,343,284 | B1 | 3/2008 | Gazor et al. |
| 7,886,034 | B1* | 2/2011 | Hartmann et al. ............ 709/223 |
| 8,340,025 | B2* | 12/2012 | Wandel ......................... 370/328 |
| 2007/0073537 | A1 | 3/2007 | Jang et al. |
| 2007/0281617 | A1 | 12/2007 | Meylan et al. |
| 2008/0123610 | A1 | 5/2008 | Desai et al. |

* cited by examiner

*Primary Examiner* — Kabir A Timory
*Assistant Examiner* — Gina McKie
(74) *Attorney, Agent, or Firm* — Vorys, Sater, Seymour and Pease LLP; Vincent M DeLuca

(57) ABSTRACT

A radio apparatus comprising: a first transceiver means arranged to receive and transmit packets according to a first protocol; a second transceiver means arranged to receive or transmit packets according to a second, different protocol, the second transceiver means being located such that interference is possible between packets of the first and second protocols; analyzing means for determining a probability that a packet to be transmitted or received by the first transceiver means does not contain only redundant information; and decision means for making a decision based on the determined probability as to whether or not the packet should be respectively transmitted or received. The first transceiver means is arranged to respectively transmit or receive the packet or not according to the decision.

26 Claims, 1 Drawing Sheet

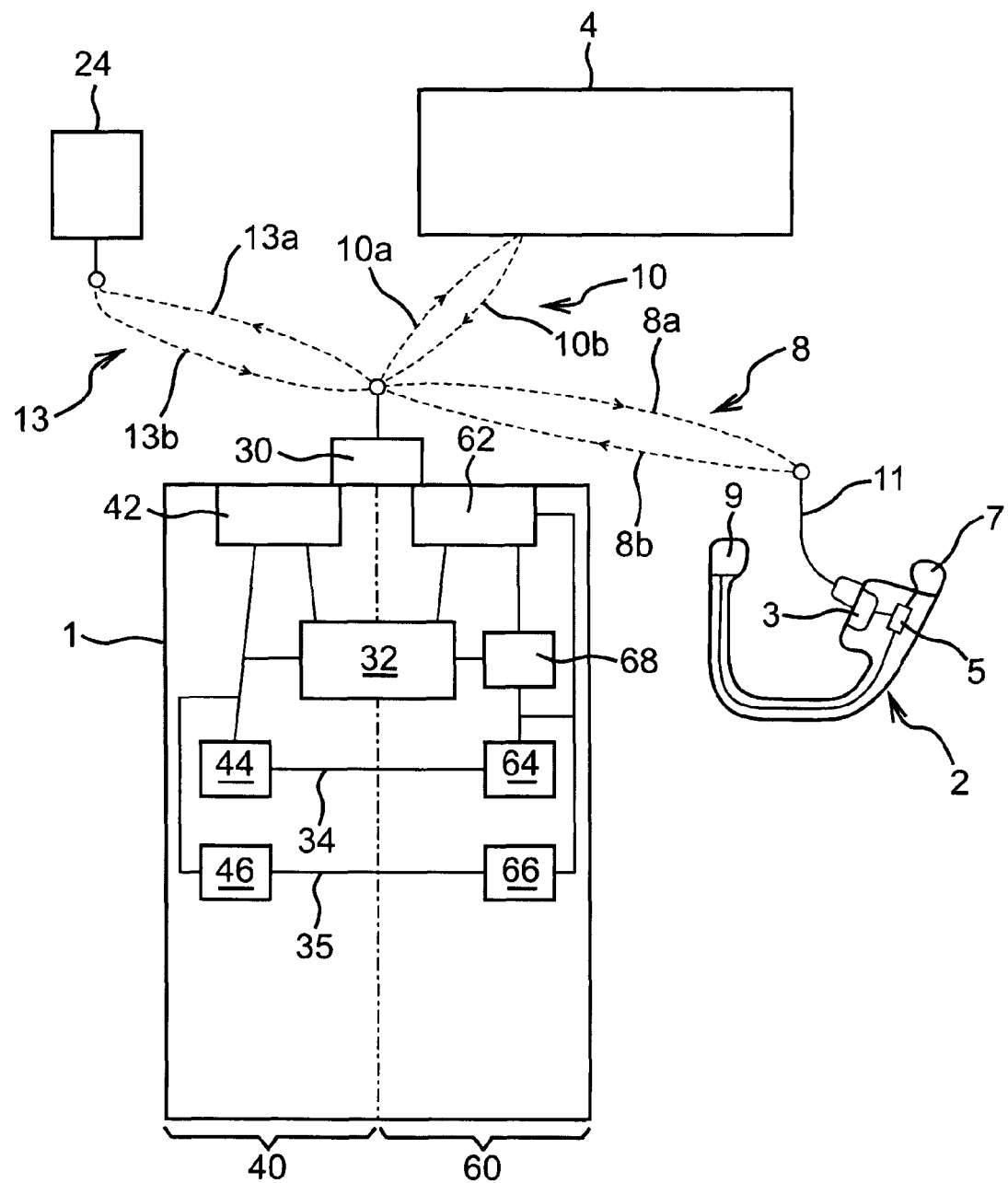

RADIO APPARATUS

This invention relates to radio apparatus capable of operating in a radio communications system and in particular to such a radio when in an interference situation with another radio.

Laptop computers and other portable devices such as mobile telephones and PDAs (personal digital assistants) are now commonly equipped with radio transceivers that allow them to be connected to a communications network, for example via wireless local area network (WLAN) access points or base stations, for the transfer of data. One example of a set of commonly used wireless network standards is the IEEE 802.11 system. In such a system access points are provided at fixed locations. Other devices can connect by radio to an access point and thereby transmit and receive data to and from a network to which the access point is connected. Typically, the access point will be connected to the internet.

Such devices are capable of carrying out multiple functions. For example, a mobile telephone might be capable of downloading music and ringtones from the internet to be stored and subsequently played and have an in-built camera and video recorder, in addition to its usual voice and message communications capabilities. A laptop computer can carry out all the functions of a standard PC and could also be provided with VoIP (Voice over Internet Protocol) capabilities. Typically a PDA provides combined computing and telecommunications functions. These devices are designed with a computer architecture including a central processing unit (CPU) controlling other modules such as the camera, data and voice transceivers and various memories.

It is common for devices of the type discussed above to be provided with the capability to operate according to another protocol, for example in a short range frequency-hopping radio system such as Bluetooth, as well as being able to connect to a WLAN. This enables the device to carry out multiple functions simultaneously, for example to be downloading data, whilst being in a telephone call via a headset. In order to be capable of operation within both systems, such a device must be provided with both an IEEE 802.11 radio and a Bluetooth radio. When both types of radio are provided in a single device the radios are said to be collocated and are capable of interfering with each other. Interference can also occur between an IEEE 802.11 radio in one device and a Bluetooth radio in another device when the two devices happen to be brought into close physical proximity e.g. if an active user of a WLAN-enabled laptop has a telephone conversation on his or her mobile telephone through a Bluetooth headset.

Both IEEE 802.11 and Bluetooth operate in the 2.4 GHz ISM (industrial, scientific, and medical) frequency band. IEEE 802.11 has a signalling method which uses modulation techniques known as DSSS (Direct Sequence Spread Spectrum) and OFDM (Orthogonal Frequency Division Multiplexing). By contrast, the Bluetooth system uses FHSS (Frequency Hopping Spread Spectrum) including AFH (Adaptive Frequency Hopping) which allows it to avoid using crowded frequencies. The choice of modulation technique used in the two standards reflects the different intended purposes of the two systems, Bluetooth being designed to be cheap and robust whereas throughput being an important factor in the IEEE 802.11 system. Although the two systems operate in the same ISM frequency band their different multiplexing schemes employing the different modulation techniques minimise interference in general use. However, when Bluetooth and IEEE 802.11 radios are collocated or in close proximity such that, for example, there is insufficient isolation between the two radios or they share an antenna via a switch, even though the two systems may use non-overlapping frequencies, the IEEE 802.11 data throughput is seriously degraded by Bluetooth voice links. In the Bluetooth radio system, frequency hopping is performed for 79 channels 1 MHz wide in the range from 2402 to 2480 MHz central channel frequency, or if AFH is used, any number of channels between 20 and 79. Within the 2.4 GHz ISM band the IEEE 802.11 system allocates up to 14 channels, typically 22 MHz wide, with centre channel frequencies from 2412 to 2484 MHz. Therefore, a transceiver of IEEE 802.11 signals can interfere with or suffer interference from some of the Bluetooth channels. This is especially true in certain circumstances.

Examples of the circumstances when interference is problematic between IEEE 802.11 and Bluetooth radios are when a single antenna is shared between the two radios (which would happen if the two radios are provided in the same device and there are severe space constraints), when data is being predominantly transferred from a remote access point to the local IEEE 802.11 radio (e.g. downloads from the internet, the WLAN base station being the remote access point), when the IEEE 802.11 received signal strength is low, and when long IEEE 802.11 data packets are being used. It is data reception to the IEEE 802.11 radio that suffers in such circumstances for various reasons, including Bluetooth concentrates the energy in a narrower band so all of the Bluetooth power will be within the IEEE 802.11 receive filter, but only a small proportion of the IEEE 802.11 power will be within the Bluetooth receive filter.

Most arbitration schemes will give priority to Bluetooth voice over all other traffic, so (especially if an antenna is being switched) IEEE 802.11 will suffer as a result.

Successful data transfer on IEEE 802.11 requires an ACK to be transmitted back to the WLAN Access Point (AP), but this is likely to be blocked by any arbitration scheme during Bluetooth voice packets. Data or Management packet transmissions by the collocated IEEE 802.11 transceiver can be scheduled to fit in the gap between Synchronous Connection Orientated (SCO) packets of the Bluetooth voice, but the downlink from the access point is typically asynchronous and uncoordinated.

The interference means that transmissions of packets by a Bluetooth radio are likely to prevent reception of packets from an access point by the IEEE 802.11 radio. This will be the case if a single antenna is switched between the two radios, two separate antennas are used or a single antenna is shared via a splitter. It will tend particularly to happen at extremes of range of the radio protocol that is being received by the device: in this example IEEE 802.11. This is especially problematic because IEEE 802.11 downlinks from the access point are typically unsynchronised to the Bluetooth activity (as noted above).

Any errors in the IEEE 802.11 signals are treated in accordance with the protocol. Thus if the IEEE 802.11 radio fails to receive a data packet correctly, two actions may be taken by the remote access point because it has failed to receive an acknowledgement. Firstly, the remote access point attempts to resend the data at a lower data rate by (i) increasing the amount of Forward Error Correction (FEC), (ii) reducing the number of bits encoded per symbol and (iii) reducing the symbol rate. Any combination of (i), (ii) and (iii) can be used, often only one or two of the techniques being used. Secondly, the remote access point waits some time before re-sending the data, and each time sending fails, it waits longer before attempting re-transmission. More specifically the IEEE 802.11 remote access point uses contention-based access to the wireless medium, selecting a random time to attempt transmission within a back-off window and only transmitting if it does not detect another device starting a transmission earlier. There is a finite probability that the remote access point and another device may select exactly the same time to transmit which could be a reason for the packet not having reached the IEEE 802.11 radio. Each time a re-transmission is made, the size of the back-off window is doubled (up to a limit). The combination of all these effects results in a "death spiral" of reduced IEEE 802.11 throughput.

It is also possible for the interference to work the other way around such that the Bluetooth packets suffer interference as well as creating interference when other radio protocols are active.

Coexistence schemes which aim to minimise interference between collocated radios are in use. One example of such a scheme is given in IEEE 802.15.2-2003 section 6 which uses Packet Traffic Arbitration (PTA). Requests from both radios are received at the PTA unit which authorises transmission and reception of messages. If two requests are received for simultaneous activity, the PTA unit predicts whether one or both requests are likely to suffer interference in view of the other and then allows or denies one of the requests as appropriate. Implementation of this scheme and other similar schemes depends on the RF design of the product, for example whether a single antenna is switched between the two radios or whether some degree of simultaneous operation is possible by use of multiple antennas or a coupler/splitter. Operation of such a scheme can be enhanced by use of power save modes e.g. use of IEEE 802.11 power-save to schedule downlink traffic between Bluetooth SCO slots. However, such coexistence schemes are often unsatisfactory for various reasons. One reason is that the remote transmitter from which a denied signal has been received does not know that arbitration is being performed at the device. Consequently the remote transmitter can not distinguish between failure to deliver a packet due to an arbitration decision and failure due to poor channel conditions. The remote transmitter will attempt re-transmission as previously explained regardless of the reason for failure, even though re-transmission may be pointless in view of arbitration. Thus network resources are used unnecessarily and further interference may result. Another reason is that preventing full simultaneous operation of both radios reduces the proportion of time that the wireless medium can be used and hence reduces maximum throughput. A further reason is that significant delay can be suffered by a message whose request has been denied and consequently performance and reliability are affected.

It would be desirable to mitigate interference between a radio which could interfere with another radio operating under another radio protocol whilst minimising performance degradation.

According to a first aspect of the present invention, there is provided a radio apparatus comprising: a first transceiver means arranged to receive and transmit packets according to a first protocol ; a second transceiver means arranged to receive or transmit packets according to a second, different protocol, the second transceiver means being located such that interference is possible between packets of the first and second protocols; analysing means for determining a probability that a packet to be transmitted or received by the first transceiver means does not contain only redundant information; and decision means for making a decision based on the determined probability as to whether or not the packet should be respectively transmitted or received, wherein the first transceiver means is arranged to respectively transmit or receive the packet or not according to the decision.

According to a second aspect of the present invention, there is provided a method of reducing interference between a first and a second transceiver located in a radio apparatus, the first transceiver being operable to receive and transmit packets according to a first protocol and the second transceiver being operable to receive or transmit packets according to a second, different protocol, the method comprising the steps of: determining a probability that a packet to be transmitted or received by the first radio apparatus does not contain only redundant information; making a decision based on the determined probability as to whether or not the packet should be respectively transmitted or received; and respectively transmitting or receiving the packet or not according to the decision.

In the Bluetooth system, devices are categorised as being "master" or "slave" devices. One master device can have a point-to-point connection with up to seven slave devices, thus forming a piconet. The standard Bluetooth protocol dictates that voice packets are transmitted between a master and slave at strictly regular intervals under the Synchronous Connection Orientated (SCO) protocol, regardless of content. There may be a maximum of three SCO links within a piconet. The master device is set up to reserve slots periodically and thus packets are transmitted at regular intervals. This continues for the entire duration of the SCO link. This duration is defined as starting either when the call is requested or when the user starts to use the Bluetooth headset. The end of the duration is defined as when the user stops using the Bluetooth headset or the call ends. Bluetooth also uses the extended SCO (eSCO) protocol which also has strictly periodic reserved slots but may also have a limited number of re-transmission slots following the reserved slots.

In telephony applications, voice data has the characteristic that (in a particular direction) there are significant and regular gaps of silence. This means that during an active call, for example in a packet-based system, there will be many packets transmitted that do not contain any proper voice data but rather only contain redundant information including background noise. Such packets are nevertheless capable of interfering with an IEEE 802.11 radio situated in close enough proximity for interference to be a problem.

It can therefore be understood that the various aspects of the invention are advantageous because they enable a radio such as a Bluetooth radio to change its behaviour as compared to a standard protocol to reduce the number of voice packets being transmitted during a call. If fewer packets are transmitted, the likelihood of interference with another radio in close proximity is reduced. Even though interference with the other radio is reduced, the radio such as a Bluetooth radio would not suffer a significant degradation to its voice link. By preferentially selecting certain packets not to be transmitted based on whether they contain voice data or only redundant information, intelligibility of speech can nevertheless be maintained. Such preferential selection can also be used to select certain packets not to be received, as will be explained in more detail below.

The various aspects of the invention are similarly advantageous with respect to transmission of other information packets such as data or non-voice audio packets. Although such transmission may not contain as many packets not carrying information except redundant data, there are nevertheless likely to be gaps in transmission of non-redundant data. Thus the invention is also applicable to non-voice data such as non-voice audio packets and video.

It can be understood that the term "redundant" information comprises various types of information in dependence on the application. For example, when implementing the invention for voice packets, any background noise could be considered to be redundant information because it distracts from the speech. Thus background noise could take various forms such as traffic noise and speech other than that from the users and could include background audio in this case. On the other hand, if the invention is being implemented for non-voice audio packets, all non-silent audio data including music and sound-effects would be non-redundant. Thus any information that is unnecessary or superfluous to the particular application is considered to be redundant.

The invention has the further advantage of saving power in the device, because if fewer packets are transmitted, less total energy is transmitted.

The invention will now be described, by way of example, with reference to the accompanying drawing, in which:

FIG. 1 shows a mobile telephone, its associated headset, a further mobile telephone and a WLAN access point for use in embodiments of the invention.

In the FIGURE, like reference numerals indicate like parts.

FIG. 1 shows an example of a situation in which interference can occur between two radio systems of different types. In this embodiment the first radio system comprises a pair of Bluetooth radios and the second radio system of a different type comprises an IEEE 802.11 radio associated with an IEEE 802.11 Wireless Local Area Network (WLAN) access point.

In the FIGURE there is shown a mobile telephone (handset) 1 and its associated headset 2. There is also an IEEE 802.11 Access Point (AP) 4, which as well as providing a local network access point also provides a gateway to the internet for devices within its range. Although in the FIGURE only the handset 1 (and the headset 2) are within range of the AP 4, in practice the AP 4 can serve many devices simultaneously. Wireless connections are shown with dotted lines. Thus there is a wireless connection 8 between the handset 1 and the headset 2. There is a wireless connection 10 between the handset 1 and the AP 4.

In FIG. 1 there is further shown another mobile telephone handset 24. To avoid complicating the following description, the handset 24 is assumed to be remote to the other components, but it could be within range of the AP 4. In this embodiment the handset 1 and the other handset 24 are capable of wireless communication with each other in accordance with a cellular protocol, and the handset 1 can undertake such a call in conjunction with the headset 2. It will be appreciated that the two handsets could alternatively communicate using a VoIP protocol via the AP 4.

In operation, various interference situations can arise as a result of the close proximity of two radios. One example is that the handset 1 could be downloading data from the internet through the AP 4 while being in an active telephone call using the headset 2. In order to be able to carry out both of these actions, the handset 1 is provided with both an IEEE 802.11 radio and a Bluetooth radio. Thus interference could occur between these two radios. The headset 2 is also provided with a Bluetooth radio. Thus interference with the IEEE 802.11 radio could occur with the Bluetooth radio within the handset 1 as a result of Bluetooth signals between the headset 2 and the handset 1.

The situation of the mobile telephone downloading data via the AP 4 and being in an active telephone call with the other handset 24 using the headset 2 is now considered in more detail.

The wireless connection 10 between the handset 1 and the AP 4 is shown as bi-directional, a first connection 10*a* representing transmissions from the handset 1 to the AP 4 and a second connection 10*b* representing transmissions from the AP 4 to the handset 1. The handset 1 has an aerial 30 through which wireless signals are transmitted and received. In this embodiment the aerial 30 is shared between the IEEE 802.11 and Bluetooth radios of the device, by means of a splitter as known in the art.

The handset 1 comprises an IEEE 802.11 radio 40 and a Bluetooth radio 60. In the FIGURE, the handset 1 is shown to be divided by a chained line into left and right portions, the left portion being the IEEE 802.11 radio 40 and the right portion being the Bluetooth radio 60. The IEEE 802.11 and Bluetooth radios are not completely independent but are linked in various ways. The IEEE radio 40 includes a Voice over IP (VoIP) application 44 and a data processing unit 46 whilst the Bluetooth radio 60 includes a voice processing unit 64 and a data processing unit 66. Firstly, voice data can pass via the connection 34 between the VoIP application 44 of the IEEE 802.11 radio and the voice processing unit 64 of the Bluetooth radio 60. Secondly, data transfer can occur between the two data processing units 46 and 66 via a connection 35.

Also shown in the handset 1 are two transceivers. In the IEEE 802.11 radio 40 there is a transceiver 42 for transmitting and receiving external signals and messages via the aerial 30 to the AP 4. In the Bluetooth section 60 there is a transceiver 62 for transmitting and receiving signals and messages via the aerial 30 with the headset 2. The transceivers 42, 62 are shown in the FIGURE to be at the top of the handset 1 proximate to the aerial 30. Both transceivers 42, 62 are arranged to be connected to various other modules of the handset 1. For example, the IEEE 802.11 transceiver 42 is connected to the VoIP application 44 and the data processing unit 46. Similarly, the Bluetooth transceiver 62 is connected to the voice processing unit 64 and the data processing unit 66. It will be appreciated by those skilled in the art that the transceivers comprise receiving and transmitting means which are used respectively for receiving incoming packets and transmitting outgoing packets.

Further, there is shown a central arbitration unit 32 in the handset 1. This is common to both sections of the handset 1 and is connected to both the transceivers 42, 62. It could in practice form a part of a controller of the handset 1. It is connected to all four of the voice and data modules 44, 46, 64, 66 discussed above. Its purpose is to allocate priorities for receiving and/or transmission to incoming and outgoing voice and data information packets.

In the Bluetooth section 60 there is an additional component denoted by reference numeral 68, which is a Voice Activity Detection (VAD) unit. This VAD unit 68 is arranged to be connected to the Bluetooth transceiver 62, the central arbitration unit 32 and the Bluetooth voice processing unit 64. This unit is capable of analysing packets of voice data and thereby determining whether a packet contains actual voice data or whether it merely contains background noise. This unit also comprises some logic for requesting the central arbitration unit 32 to allow certain action to be taken with respect to voice packets, as will be explained in more detail below.

It will be understood by those skilled in the art that a handset capable of operating in both the IEEE 802.11 and Bluetooth systems would in practice have many more modules arranged to include a protocol stack. FIG. 1 is intended to illustrate schematically a small number of the functional features of such a handset for the purpose of enabling a better understanding of embodiments of the invention. In practice there may not be such a clear-cut division between the IEEE 802.11 and Bluetooth radios and the components as shown. In particular the central arbitration unit 32 and the VAD unit 68 may be provided within a single module which also comprises control and processing functions and this could be part of the same module as the Bluetooth transceiver 62. Furthermore, the embodiment described below where the handset 1 is downloading data does not make use of the VoIP components in the handset. These components are not essential but if present could be used in embodiments of the invention.

FIG. 1 also shows schematically the headset 2. The headset 2 comprises a transceiver 3, connected to a VAD unit 5. There is an aerial 11 via which the transceiver 3 transmits and receives signals. The headset is also provided with a speaker 7 and a microphone 9. The speaker 7 and the microphone 9 are both connected to the transceiver 3 through the VAD unit 5. It will be appreciated by those skilled in the art that the layout of components of the headset 2 could vary and that other components may be present in the headset 2. In particular the VAD unit 5 could be provided as part of a control and processing module and this module could incorporate the transceiver 3.

The wireless connection 8 between the handset 1 and the headset 2 is shown as bi-directional, a first connection 8a representing transmissions from the handset 1 to the headset 2 and a second connection 8b representing transmissions from the headset 2 to the handset 1.

Similarly, the other handset 24 of FIG. 1 is shown, with a bi-directional wireless connection 13 to the handset 1. A first connection 13a represents transmissions from the handset 1 to the other handset 24 and a second connection 13b represents transmissions from the other handset 24 to the handset 1. The wireless connection 13 shows schematically communications between the handset 1 and the other handset 24, which are carried out in accordance with a mobile telephone network protocol as known in the art. Similar communication would occur with other handsets not located within access range of the AP 4. Examples of such network protocols are cellular protocols (e.g. GSM, CDMA, UMTS). In practice such communications would occur via at least one network element such as a base station and/or base station controller, but such elements are omitted from FIG. 1 for clarity. The handset 1 may have some extra components for handling such communications but these are not shown in FIG. 1. Equally it will be appreciated that if the other handset 24 were within the range of the AP 4, the handset 1 and the other handset 24 could communicate using VoIP accessed by the IEEE 802.11 transceiver 40.

In operation, various communications are carried out in the air space between the two handsets 1, 24, the headset 2 and the AP 4. The wireless connection 10 shows communications between the handset 1 and the AP 4 in accordance with the IEEE 802.11 standard protocol. This standard protocol defines various features of transmission, such as the format of control signals, standard packet format and size, the transmission frequency, the length of each data burst and so on. The protocol also defines other features which affect how data is processed in the handset 1 such as error checking and correction, registration of users, connections between users etc. Both messages and control signals are transmitted. Messages are segmented into packets or frames prior to being transmitted. These packets or frames can carry information of various types e.g. video data, voice data, text, files etc.

Similarly the wireless connection 8 shows communications between the handset 1 and the headset 2 in accordance with the standard Bluetooth protocol. Part of the Bluetooth protocol defines how non-voice data is transmitted. Another part of this protocol defines how voice data is transmitted in accordance with the Synchronous Connection Orientated protocol. In the SCO protocol, once there is an active voice connection between two devices such as the handset 1 and the headset 2, a pair of two consecutive time slots, one in the uplink (handset to headset) and the other in the downlink (headset to handset) are reserved at fixed intervals. Thus voice data is transmitted at regular intervals in both directions as long as the connection is active. So according to the SCO protocol voice data is transmitted in this manner for the entire time that a user of the handset 1 and headset 2 is engaged in a telephone call using the headset 2.

As previously mentioned, the regular transmission of voice data in accordance with the Bluetooth protocol as described above gives rise to many "empty" voice data packets which do not contain any voice data but contain only redundant information including background noise. This is because during a telephone conversation, usually only one person is speaking at any one time and also because of pauses in an individual's speech. For example if the user of the handset 1 is speaking into the headset 2, voice data is picked up at the microphone 9, processed into voice packets in the transceiver 3 and then sent out via the aerial 11 of the headset 2 across the wireless connection 8b to the aerial 30 of the handset 1. The packets are sent in accordance with the Bluetooth protocol at regular intervals in one slot of each pair of allocated time slots as described above. Once received by the handset 1 they are processed and sent onto the other handset 24. Such packets contain actual wanted voice data. In other words such packets contain non-redundant information.

However, during the same time period, in the others of the pairs of allocated time slots, packets are transmitted from the handset 1 to the headset 2 across the wireless connection 8a. These packets are effectively empty, containing only background noise and other redundant information because the user of the other handset 24 is not speaking.

Similarly, when the user of the other handset 24 is speaking, voice packets are received at the handset 1 from the handset 24 across the wireless connection 13b, processed and then transmitted in accordance with the Bluetooth protocol from the handset 1 to the headset 2 across the wireless connection 8a for the user of the handset 1 to hear. These packets contain voice data i.e. non-redundant information. However, during the same time, packets continue to be transmitted from the headset 2 to the handset 1 across the wireless connection 8b. These packets are effectively empty, containing only background noise and other redundant information because the user of the handset 1 and headset 2 is not speaking.

Since "empty" packets are capable of causing interference with the IEEE 802.11 radio 40 of the handset 1, embodiments of the invention seek to reduce the number of such packets transmitted, to thereby reduce the level of interference, as will now be explained. The invention is also used to reduce the number of other packets being transmitted and received as appropriate to reduce interference for the benefit of several devices.

Embodiments of the invention use Voice Activity Detection (VAD) or Silence Suppression to avoid transmitting unnecessary packets and thereby reduce the level of interference between the Bluetooth and nearby IEEE 802.11 radios. This technique can be used to mitigate both the interference generated by the Bluetooth radio and, when combined with some arbitration logic, the interference suffered by the Bluetooth radio. By not sending some of the standard Bluetooth protocol voice packets, the time for which the IEEE 802.11 receiver is blocked is reduced, thereby increasing throughput.

The VAD unit 68 operates using one of the following signal processing techniques or more than one in combination to detect the presence of voice data:

Peak energy; Minimum energy; Prediction gain; Average normalized squared pitch correlation; Spectral non-stationarity.

The techniques employed by the VAD unit 68 are not of course limited to the above but any suitable voice detection technique can be used. In this embodiment these techniques are used in conjunction with one or more criteria defining what constitutes non-redundant information and specifically voice data and what constitutes only non-redundant information or background noise. These criteria are stored in a memory forming part of or associated with the VAD unit 68, which as previously explained could all be provided as part of a control and processing unit of which the VAD unit 68 (and possibly the central arbitration unit 32) forms a part. Thus the VAD unit 68 analyses the content of the packet as compared to the stored criteria. The VAD unit 68 can thus determine whether or not a packet contains voice data by detection of voice data in the packet and by means of the stored criteria. It will be appreciated that storing of criteria is not the only means by which the analysis could be conducted.

An embodiment of the invention can be applied to the handset 1 of FIG. 1. The handset 1 in this embodiment comprises the central arbitration unit 32 which arbitrates between requests for receiving and transmission of voice data by the Bluetooth radio 60 and data received from or transmitted to the AP 4 for the IEEE 802.11 radio 40.

When a user of the handset 1 and headset 2 connects into an active call using the headset 2, voice data packets begin to be created in the handset 1 and the headset 2. If the handset 1 and headset 2 were standard ones in accordance with the prior art, these packets would be transmitted at regular intervals in accordance with the Bluetooth protocol between the handset 1 via the aerial 30 and the headset 2 across the wireless connection 8 as previously described. In this embodiment the active call is with the other handset 24 and therefore packets in accordance with a cellular protocol are also received and sent over the cellular link 13 between the handset 1 and the headset 24 (via network elements as previously explained). The handset 1 differs from a standard handset in that in addition to sending voice packets received from the other handset 24 directly to a voice data processing unit such as the voice data processing unit 64 in FIG. 1, all received voice data packets are sent to the VAD unit 68. Thus for the duration of the active call, the VAD unit 68 detects whether or not voice data is arriving from the other handset 24 via the aerial 30. This can be done in conjunction with stored criteria as will be explained below. If the user of the other handset 24 is speaking, voice data is incoming to the handset 1 and is picked up at the aerial 30 and sent to the VAD unit 68 which thereby knows that actual voice data is present.

The handset 1 further differs from standard handsets in that it comprises the central arbitration unit 32. In the situation where the user of the other handset 24 is not speaking, the VAD unit 68 determines that there is no actual voice data incoming to the handset 1 from the other handset 24. It is able to do this because the voice data is passed, after some processing by cellular components of the handset 1 (not shown), to the VAD unit 68. In this situation, the VAD unit 68 requests the central arbitration unit 32 to disallow the sending of Bluetooth voice data packets out from the handset 1 to the headset 2. This request is made because if there is no actual voice data to be sent to the headset for the user of the handset 1 and headset 2 to hear, such packets will be effectively "empty" containing only background noise. Upon receiving this request, the central arbitration unit can decide to allocate a low priority to outgoing Bluetooth voice packets and to allocate a higher priority to IEEE 802.11 packets incoming to or outgoing from the IEEE 802.11 transceiver 42 if appropriate. This would mean, for example, that if the user of the handset 1 was downloading for example a video from the AP 4, this could be given a higher priority than outgoing Bluetooth voice packets, thereby reducing disruption to the downloading process. In this case, if the aerial 30 had previously been switched to receive Bluetooth packets, it would be instructed to switch to receiving IEEE 802.11 packets.

In this situation i.e. when the user of the other handset 24 is not speaking, it is likely that Bluetooth packets would still need to be received from the headset 2 at the handset 1 at regular intervals because the user of the handset 1 is likely to be speaking and his or her speech would be picked up at the microphone 9 and thereby transmitted in packets to the handset 1. Thus a high priority is given to packets incoming from the headset 2 at this time.

In the situation where incoming voice data is present because the user of the other handset 24 is speaking, the VAD unit 68 requests the central arbitration unit 32 to allow voice data packets to be sent out of the handset 1 to the headset 2 for the user of the handset 1 and headset 2 to hear. Upon receiving the request, the central arbitration unit makes a decision that the packets should be transmitted and therefore allocates a high priority to the voice data packets. The voice data is passed, after some processing by cellular components of the handset 1 (not shown), to the voice data processing unit 64. The voice data processing unit 64 carries out various processing steps on the data such as checking for errors and then the voice data is segmented into voice data packets and then passed to the VAD unit 68. The segmented data is then sent out from the transceiver 62 to the headset 2 across the wireless connection 8a.

The handset 1 is arranged to have a further refinement in the above-described situation i.e. when the user of the other handset 24 is speaking. Although voice data packets would in a standard system be incoming from the headset 2 to the handset 1 at regular intervals, it is likely that the user of the handset 1 is not speaking and consequently, voice packets being transmitted from the headset 2 to the handset 1 (for subsequent transmission to the user of the other handset 24) will be empty packets containing only background noise. In other words, the probability that these packets contain actual voice data is low. Thus on this assumption the VAD unit 68 requests the central arbitration unit 32 to allocate a low priority to receiving Bluetooth packets from the headset 2. Upon receiving this request, the central arbitration unit 32 can decide to allocate a low priority to such packets and instruct the transceiver 62 to cease reception of Bluetooth packets from the headset 2. Consequently, interference with any IEEE 802.11 activity is reduced. This would mean, for example, that if the user of the handset 1 was downloading for example a video from the AP 4, this could be given a higher priority than incoming Bluetooth voice packets, thereby reducing disruption to the downloading process.

It will be appreciated that this further refinement makes the assumption that the user of the handset 1 is not speaking when the user of the handset 24 is speaking. Thus when the further refinement is implemented, the user of the handset 1 can not "speak over" the user of the handset 24. However, implementation in this manner is of benefit to the IEEE 802.11 radio 40.

It will be appreciated that the handset 24 or the cellular network in which it operates could also be implementing a voice detection system, possibly in accordance with or similar to embodiments of the present invention. If this is the case, there may be periods during which no voice packets are received at all at the handset 1. Thus the VAD unit 68 can determine that there is no actual voice data incoming from packets received over the cellular network either by analysis of incoming packets or by the absence of incoming packets.

In a standard handset and headset arrangement, during an active call the handset would continually receive voice packets from the headset 2, some of which would contain only background noise. Even if the handset 1 were used with a standard headset, this embodiment would be applied to voice data packets incoming from the headset. As can be seen in FIG. 1, the headset 2 differs from a standard Bluetooth headset in that it comprises the VAD unit 5 and in that the transceiver 3 is modified from a standard transceiver. Thus the headset 2 could be arranged to implement a voice suppression technique, in which case even fewer packets would be received at the handset 1 from the headset 2.

It can be appreciated that using a combination of the above-described methods to reduce the number of empty voice packets transmitted and received optimises functioning of the handset 1. For example, implementing the detection system described above in the handset on its own would be of significant benefit but if it were combined with the "further refinement" described above, even fewer packets would be received at the handset 1 from the headset 2. The handset 1 can be used with a standard Bluetooth headset. However, if the exemplary handset 1 were used in conjunction with the headset 2 which was also implementing voice suppression, even fewer packets would be received at the handset 1 from the headset 2. (Once a call at the handset 1 using the headset 2 is active the central arbitration unit 32 would not know in advance that the headset 2 would not be transmitting packets at certain times. However, the Bluetooth receive operation can be aborted quickly when the expected packet header is not received, thereby allowing IEEE 802.11 activity to be given a higher priority.) However, implementation of any one or more of the techniques would be beneficial.

Ideally, the Bluetooth radio 60 would only suppress receiving and transmission of voice packets when it would be likely to be of significant benefit to the collocated IEEE 802.11 radio 40 so as to minimise disruption to normal Bluetooth transmission patterns and hence to minimise adverse affects on speech. Therefore, packets to be sent out from or received by the IEEE 802.11 radio portion 40 of the handset 1 are also subject to arbitration in the central arbitration unit 32.

When information packets are received from the AP 4 via the aerial 30, they are received into the IEEE 802.11 transceiver 42. Instead of passing the information directly to the data processing unit 46, the information packets (or a part of the packets which enable the central arbitration unit to analyse them) are passed to the central arbitration unit 32. The central arbitration unit analyses the packets and uses the results of the analysis to predict the content of future packets to be received. Although IEEE 802.11 packets which have already been received can not be arbitrated, the central arbitration unit uses their nature or other related information to allocate a priority to future packets depending on the nature of the information carried by them. For example, if a received packet is VoIP, the central arbitration unit 32 can expect further similar packets and can decide to allocate those a high priority and thereby prioritise them over Bluetooth packets that contain only background noise. The exact arrival time of such packets can not be accurately known because they must contend with other transmissions but the central arbitration unit 32 can expect subsequent packets of a message to arrive soon and can therefore set the transceiver 42 to be active when such packets are expected. Similarly, the central arbitration unit 32 knows that the AP 4 sends out regular beacons providing network maintenance information. These are scheduled to be transmitted at regular target times and thus the central arbitration unit 32 can predict the timing of these packets. It might decide to allocate these a high priority and prioritise them over Bluetooth packets that contain only background noise. If, on the other hand, the beginning of a text, file or video data message is received, future packets could be allocated a medium priority. This is because such data can be subjected to some delay but still be usable for the user of the handset 1. Such a decision might also be based on the required throughput of a message. Therefore, some future packets may not be received (because the aerial 30 is switched to Bluetooth) but in view of the voice analysis techniques described above, the chance of successfully receiving those packets when they are re-transmitted by the AP 4 (before the AP 4 has re-tried so many times the link is dropped), is significantly increased over the chance that a standard handset would have.

Packets to be sent out by the IEEE 802.11 radio 40 can be arbitrated before being sent out and can be sent immediately or held whilst Bluetooth activity occurs as appropriate.

Data packets allocated a high priority would be received and/or transmitted immediately. Data packets allocated a medium priority would be received or transmitted as quickly as possible but might be delayed for a time where appropriate. For example, if the Bluetooth VAD unit 68 has requested transmission of voice data to the headset 2 this would take priority over the IEEE 802.11 data. However, because the invention limits the number of Bluetooth voice data packets transmitted to the headset 2, during periods when the transceiver 62 has been instructed not to send out Bluetooth voice data packets, IEEE 802.11 data packets can be safely transmitted or received without interference with Bluetooth packets. Thus reception of a data message into the IEEE 802.11 radio 40 of the handset 1 is completed far more quickly than in a prior art device in which reception of the packets forming the message would have a much lower throughput. This is because, in view of the various means described above, the IEEE 802.11 data is allocated a higher priority than non-voice data-containing Bluetooth packets. Thus although some buffering of the IEEE 802.11 data is still required, it is required to less of a degree and, in addition to allowing faster processing, errors in the IEEE 802.11 data are less likely as explained above.

If desired, the voice activity detection procedure can be disabled when appropriate. In this embodiment no extra signalling need be used as the central arbitration unit 32 (or some other functional unit within the Bluetooth transceiver 62) can determine the signal quality of the IEEE 802.11 signals from received packets or other signals received on the IEEE 802.11 link. If the indicators of signal quality are such that there would be no benefit to implementing suppression of voice packets, then voice packets can be sent out at regular intervals in accordance with the Bluetooth protocol as normal. This might be the case, for example, if the signal on the IEEE 802.11 radio 40 is very strong in comparison to the voice link signal on the Bluetooth radio 60 and the antenna is not being shared via a switch, in which case it would be undesirable to risk disruption of the voice link. Equally, if the IEEE 802.11 radio 40 is not in use, there is no need to implement any packet suppression.

In this embodiment a storage device such as a memory for storing information and data on various types of signals is incorporated in the central arbitration unit 32. Such information relates to characteristics of the signals such as interference patterns, minimum desirable signal strengths, optimum operating frequencies etc. This information can be used to assist in determining whether there exists an interference situation which warrants implementation of voice activity detection and packet suppression. The central arbitration unit 32 stores information on the characteristics of the Bluetooth signals used by the handset 1. The received signal quality of the IEEE 802.11 is compared to the characteristics of Bluetooth signals which may or may not (depending on the result of the comparison and their priority) be sent out. This comparison enables the likelihood that the Bluetooth and IEEE 802.11 signals might interfere with each other to be determined. The central arbitration unit 32 can also store information on the characteristics of IEEE 802.11 signals. In this case the comparison process can use the stored characteristics of the IEEE 802.11 signals to assist in determining whether Bluetooth signals of a particular strength might interfere with a particular type of IEEE 802.11 data stream to be sent or received.

It is noted that comfort noise will need to be injected at both ends of the link when Bluetooth SCO packets are not transmitted (and therefore not received) but this is the Bluetooth protocol's standard behaviour, as the Bluetooth protocol has to accommodate SCO packets that were transmitted but lost due to propagation/interference issues. The quality and intelligibility of speech would therefore not be significantly affected.

Thus it can be appreciated that embodiments of the invention improve IEEE 802.11 data throughput without reducing the intelligibility of a concurrent Bluetooth voice link. Embodiments of the invention take advantage of more application-specific knowledge than is used by existing coexistence schemes because of the ability to determine the presence or likely presence of non-redundant information and alter the operation of the radios as appropriate. This results in an overall better user experience than achieved with existing coexistence mechanisms.

When implementing the invention as described above, it is not necessary for all packets of the same type over a given time period to be subjected to the same treatment in accordance with allocated priorities. For example, in the situation where the central arbitration unit simultaneously receives a request from the Bluetooth VAD unit 68 for voice data to be transmitted to the headset 2 and a request from the IEEE 802.11 transceiver 42 to receive incoming data, although the voice data is allocated a higher priority, it does not necessarily follow that receiving of the IEEE 802.11 data is completely stopped. Instead, the central arbitration unit 32 can decide not to receive IEEE 802.11 packets for a duration of time and then decide to re-commence reception and then stop reception again etc. Thus the number of IEEE 802.11 packets received in a given longer timeframe (comprising several of the time durations) can be reduced, thereby nevertheless reducing the likelihood of interference during that timeframe. Similarly, instead of ceasing transmission of "empty" voice data packets between the handset 1 and the headset 2 completely, fewer could be sent. In other words, the technique can be applied to a variable proportion of packets depending on circumstances, including the number of packets in a message and the number of other packets which are expected to be received and/or transmitted.

It can be understood by a person skilled in the art that the applicability of the above-described embodiments is not limited to the handset 1 and headset 2. Embodiments of the invention could be applied to a handset similar to the handset 1 but having two aerials or a hybrid aerial. Embodiments of the invention could be applied to other forms of device such as PDAs and laptop computers. The embodiments could easily be modified to work within other communications systems and other protocols. In particular, it is not necessary for the invention to be used within a Bluetooth system or with an IEEE 802.11 system. The invention could be applied to other radio protocols even if such protocols involved fewer or no empty voice data packets being transmitted in their standard form. The principles of the invention could nevertheless be applied to determine whether packets contain voice data and/or to prioritise information packets between the radios. The invention is applicable to any two radios. One other radio system to which the invention could be applied is Mobile WiMAX (IEEE 802.16e) which can interfere with, for example, a Bluetooth system. Another radio system to which the invention could be applied is ZigBee (IEEE 802.15.4) which can also interfere with, for example, a Bluetooth system.

The arrangement of components in the handset 1 could be varied. One possibility is that instead of, or in addition to, using a central arbitration unit, each of the Bluetooth and IEEE 802.11 radios could have their own arbitration unit. In this case the two units would need to communicate priority information to each other to optimise performance of the device overall.

The decision as to whether packets containing only redundant information should be suppressed could be made by mechanisms other than signalling different priorities to arbitration units. For example, the Bluetooth radio could be informed of the relative signal strengths (and hence the likelihood of Bluetooth transmissions affecting IEEE 802.11 receptions) and the throughput requirements of IEEE 802.11 applications, and use such information to decide the proportion of "empty" packets containing only redundant information or only background information that should be suppressed. Decisions could also be based on the type of data carried in packets, the size of packets and the amount of data in packets. Any useful combination of the various types of information available including the priority pre-assigned to a packet by a VAD or other activity detection device could be used to decide which information packets to receive and/or transmit.

The same technique could also be applied to combinations of other communications technologies that share a common medium, i.e. that suffer from a coexistence problem, especially where one of them is carrying a voice link. It is not essential for the invention to be used with a voice link, however. For example, the same technique could be used when a radio is engaged in data transfer. In this case, the radio could be alternatively or additionally provided with a different type of information detection unit than a VAD unit. One example would be a radio engaged in receiving or transmitting the audio part of a video in which case a unit capable of detecting the presence of useful or non-redundant audio data in a packet would be used.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A radio apparatus comprising:
a first transceiver means arranged to receive and transmit packets according to a first protocol;
a second transceiver means arranged to receive or transmit packets according to a second, different protocol, the second transceiver means being located such that interference is possible between packets of the first and second protocols;
a third transceiver means arranged to receive packets;
analyzing means for determining a probability that a packet to be transmitted by the first transceiver means does not contain only redundant information, and for determining a probability that a packet to be received by the first transmitter means does not contain only redundant information; and
decision means for making a respective decision based on a respective determined probability as to whether or not a packet to be transmitted should be transmitted and whether or not a packet to be received should be received,
wherein the first transceiver means is arranged to transmit a packet that should be transmitted according to a respective decision, and to receive a packet that should be received according to a respective decision,
and the analyzing means comprises an information detection means, arranged to detect the presence of non-redundant information in packets received at the third transceiver means,
and wherein the analyzing means is arranged to determine the said probability in dependence on whether the presence of non-redundant information is detected in said packets received at the third transceiver means or not.

2. A radio apparatus according to claim 1, wherein the analyzing means is configured to determine a high probability for a packet to be transmitted by the first transceiver means and a low probability for a packet to be received by the first transceiver means if non-redundant information is detected in packets received at the third transceiver means.

3. A radio apparatus according to claim 1, wherein the analyzing means is configured to determine a low probability for a packet to be transmitted by the first transceiver means and a high probability for a packet to be received by the first transceiver means if only redundant information is detected in packets received at the third transceiver means.

4. A radio apparatus according to claim 1, wherein the decision means is arranged to, if the determined probability that a packet to be transmitted or received by the first transceiver means does not contain only redundant information is high, make a decision that the packet should be received or transmitted.

5. A radio apparatus according to claim 1, wherein the decision means is arranged to, if the determined probability that a packet to be transmitted or received by the first transceiver means does not contain only redundant information is low, make a decision that the packet should not be received or transmitted.

6. A radio apparatus according to claim 1, further comprising storing means for storing one or more criteria defining whether information is redundant or non-redundant, wherein the analyzing means is arranged to determine the said probability that a packet to be transmitted or received by the first transceiver means does not contain only redundant information by means of the stored one or more criteria.

7. A radio apparatus according to claim 1, wherein the information detection means comprises a voice activity detection means, arranged to detect the presence of voice data in packets received at the third transceiver means.

8. A radio apparatus according to claim 7, wherein the analyzing means is further arranged to determine the said probability that a packet to be transmitted or received by the first transceiver means does not contain only redundant information in dependence on whether the presence of voice data is detected or not.

9. A radio apparatus according to claim 8, wherein the analyzing means is arranged to determine a high probability for a packet to be transmitted by the first transceiver means and a low probability for a packet to be received by the first transceiver means if voice data is detected in packets received at the third transceiver means.

10. A radio apparatus according to claim 8, wherein the analyzing means is arranged to determine a low probability for a packet to be transmitted by the first transceiver means and a high probability for a packet to be received by the first transceiver means if no voice data is detected in packets received at the third transceiver means.

11. A radio apparatus according to claim 1, wherein the information detection means comprises a non-voice audio activity detection means, arranged to detect the presence of non-voice audio data in packets received at the third transceiver means and wherein the analyzing means is further arranged to determine the said probability in dependence on whether the presence of non-voice audio data is detected or not and to thereby determine a high probability for a packet to be transmitted and a low probability for a packet to be received if non-voice audio data is detected and a low probability for a packet to be transmitted and a high probability for a packet to be received if no non-voice audio data is detected.

12. A radio apparatus according to claim 1, wherein the information detection means is further arranged to detect the absence of packets at the third transceiver means and to thereby determine a low probability for a packet to be transmitted by the first transceiver means if an absence is detected.

13. A radio apparatus according to claim 1, wherein the third transceiver means is different from the second transceiver means and is arranged to receive packets according to a third protocol.

14. A radio apparatus according to claim 1, wherein the decision means comprises an arbitration means, arranged to receive notification of the determined probability that a packet to be transmitted or received by the first transceiver means does not contain only redundant information from the analyzing means and to allocate a transmission or receiving priority to a packet based on said determined probability and wherein the decision means is further arranged to make the said decision based on the allocated priority.

15. A radio apparatus according to claim 14, wherein the second transceiver means is further arranged to request the arbitration means to allocate a transmitting or receiving priority to packets, and wherein the arbitration means is arranged to allocate a transmitting or receiving priority to the said packets based on transmission and receiving priorities of other packets.

16. A radio apparatus according to claim 14, wherein the arbitration means is further arranged to inform the second transceiver means of the transmission or receiving priority of packets and wherein the second transceiver means is further arranged to respectively transmit or receive packets according to their allocated priority.

17. A radio apparatus according to claim 14, wherein the analyzing means is further arranged to request the arbitration means to allocate a transmission or receiving priority to a packet, and wherein the arbitration means is arranged to allocate a priority to the said packet based on transmission or receiving priorities of other packets.

18. A radio apparatus according to claim 14, wherein the arbitration means is further arranged to allocate receiving and transmission priorities of packets based on other information including at least one of:

type of data carried in packet; size of packet; amount of data in packet; signal strengths in the first and second protocols; throughput requirement of message of which the packet forms a part; number of packets of the message of which the packet forms part; number of packets awaiting reception and/or transmission; processing or transmission status of previously-received packets; position of packet in a message; and priority pre-assigned to packet.

19. A radio apparatus according to claim 1, wherein the second transceiver means is additionally for determining an indication of a signal quality of packets received according to the second protocol and wherein the radio apparatus further comprises:

storing means for storing information relating to characteristics of signals of the first protocol; and comparing means for comparing the said indication to the stored information to determine a likelihood of interference between signals of the first and second protocols, and wherein the decision means is additionally for making the said decision based on the determined likelihood.

20. A radio apparatus according to claim 19, wherein the storing means is further for storing further information relating to characteristics of signals of the second protocol and wherein the comparing means is additionally for determining the likelihood of interference based on the stored further information.

21. A radio apparatus according to claim 19, wherein the stored information and further information comprise one or more of:

minimum desirable signal strengths;

modeled interference behavior of the first and second radio signals; and working frequency ranges of the first and second radio signals.

22. A radio apparatus according to claim 19, wherein the decision means is arranged to, if the determined indication is below a predetermined threshold, cause the analyzing means not to be used.

23. A radio apparatus according to claim 1, further comprising:

a first local arbitration means associated with the first transceiver means and arranged to allocate receiving and/or transmission priorities to packets of the first protocol; and a second local arbitration means associated with the second transceiver means and arranged to allocate receiving and/or transmission priorities to packets of the second protocol, wherein the first and second arbitration means are arranged to inform each other of allocated priorities.

24. A radio apparatus according to claim 1, further comprising an antenna means for receiving packets from the first and second transceiver means and arranged to transmit said packets, and wherein the first and second transceiver means are arranged to send packets to the antenna means according to priorities of packets and/or said decision.

25. A radio apparatus according to claim 1, wherein the decision means is arranged to, if no real-time data is being received or transmitted according to the second protocol, cause the analyzing means not to be used.

26. A method of reducing interference between a first and a second transceiver located in a radio apparatus, the first transceiver being operable to receive and transmit packets according to a first protocol and the second transceiver being operable to receive or transmit packets according to a second, different protocol, the method comprising the steps of:

determining a probability that a packet to be transmitted by the first radio apparatus does not contain only redundant information;

determining a probability that a packet to be received by the first radio apparatus does not contain only redundant information;

making a respective decision based on a respective determined probability as to whether or not a packet to be transmitted should be transmitted and whether or not a packet to be received should be received; and transmitting a packet that should be transmitted according to a respective decision, and receiving a packet that should be received according to a respective decision, wherein the probability is determined in dependence on whether the presence of non-redundant information is detected in packets received at a third transceiver means or not.

* * * * *